United States Patent
Dunn

(10) Patent No.: US 9,154,395 B2
(45) Date of Patent: Oct. 6, 2015

(54) METHOD AND SYSTEM FOR OPTIMIZING A JITTER BUFFER

(75) Inventor: Kristin A. Dunn, Livermore, CA (US)

(73) Assignee: Cisco Technology, Inc., San Jose, CA (US)

(*) Notice: Subject to any disclaimer, the term of this patent is extended or adjusted under 35 U.S.C. 154(b) by 1442 days.

(21) Appl. No.: 11/538,977

(22) Filed: Oct. 5, 2006

(65) Prior Publication Data

US 2008/0084900 A1    Apr. 10, 2008

(51) Int. Cl.
| | |
|---|---|
| *H04L 12/26* | (2006.01) |
| *H04L 12/841* | (2013.01) |
| *H04L 12/54* | (2013.01) |
| *H04L 12/801* | (2013.01) |
| *H04L 12/925* | (2013.01) |
| *H04L 12/927* | (2013.01) |
| *H04L 12/911* | (2013.01) |
| *H04N 21/234* | (2011.01) |
| *H04N 21/44* | (2011.01) |
| *H04N 21/6547* | (2011.01) |
| *H04J 3/06* | (2006.01) |
| *H04L 12/18* | (2006.01) |

(52) U.S. Cl.
CPC .......... *H04L 43/087* (2013.01); *H04L 12/5695* (2013.01); *H04L 43/062* (2013.01); *H04L 43/065* (2013.01); *H04L 43/067* (2013.01); *H04L 47/15* (2013.01); *H04L 47/283* (2013.01); *H04L 47/722* (2013.01); *H04L 47/801* (2013.01); *H04L 47/822* (2013.01); *H04N 21/23406* (2013.01); *H04N 21/44004* (2013.01); *H04N 21/6547* (2013.01); *H04J 3/0632* (2013.01); *H04L 12/1877* (2013.01)

(58) Field of Classification Search
None
See application file for complete search history.

(56) References Cited

U.S. PATENT DOCUMENTS

| | | | |
|---|---|---|---|
| 6,205,211 B1* | 3/2001 | Thomas et al. | 379/114.06 |
| 6,842,427 B1* | 1/2005 | Evslin et al. | 370/252 |
| 6,862,298 B1 | 3/2005 | Smith et al. | 370/516 |
| 6,868,094 B1* | 3/2005 | Bordonaro et al. | 370/516 |
| 6,977,905 B1 | 12/2005 | Shaffer et al. | 370/252 |
| 6,989,856 B2 | 1/2006 | Firestone et al. | 348/14.09 |
| 7,027,456 B1 | 4/2006 | Chen | 370/412 |
| 7,058,568 B1 | 6/2006 | Lewis | 704/214 |
| 7,079,486 B2 | 7/2006 | Colavito et al. | 370/231 |
| 7,099,820 B1* | 8/2006 | Huart et al. | 704/207 |
| 7,103,129 B2 | 9/2006 | Neumann et al. | 375/372 |

(Continued)

OTHER PUBLICATIONS

PCT Notification of Transmittal of the International Search Report and the Written Opinion of the International Searching Authority, or the Declaration, mailed Mar. 6, 2008, in re PCT/US07/80379 filed Oct. 4, 2007 (10 pages).

(Continued)

*Primary Examiner* — Ashley Shivers
(74) *Attorney, Agent, or Firm* — Baker Botts L.L.P.

(57) ABSTRACT

A method for optimizing a jitter buffer includes receiving a first request to establish a video conference communication session with a remote endpoint. The method also includes sending a second request to a first network location for latency information for packet communications sent from a second network location. The method further includes receiving from the first network location the latency information for packet communications sent from the second network location. Additionally, the method includes setting a jitter buffer for the video conference communication session based on the latency information for packet communications sent from the second network location.

1 Claim, 2 Drawing Sheets

(56) References Cited

U.S. PATENT DOCUMENTS

| | | | |
|---|---|---|---|
| 7,110,422 B1* | 9/2006 | Choudhury et al. | 370/516 |
| 7,277,943 B1 | 10/2007 | Surazski | 709/226 |
| 7,397,778 B2* | 7/2008 | Jay et al. | 370/332 |
| 7,457,253 B2* | 11/2008 | Ronneke | 370/254 |
| 7,701,980 B1 | 4/2010 | Bugenhagen | 370/516 |
| 2002/0101885 A1* | 8/2002 | Pogrebinsky et al. | 370/516 |
| 2003/0026275 A1 | 2/2003 | Lanzafame et al. | 370/412 |
| 2003/0039216 A1 | 2/2003 | Sheldon et al. | 370/260 |
| 2003/0079005 A1* | 4/2003 | Myers et al. | 709/223 |
| 2003/0179761 A1* | 9/2003 | Dobbins et al. | 370/401 |
| 2003/0202528 A1 | 10/2003 | Eckberg | 370/412 |
| 2004/0073690 A1 | 4/2004 | Hepworth et al. | 709/230 |
| 2005/0207437 A1 | 9/2005 | Spitzer | 370/412 |
| 2005/0226172 A1 | 10/2005 | Richardson et al. | 370/260 |
| 2006/0095612 A1 | 5/2006 | FitzGerald | 710/52 |
| 2006/0109856 A1 | 5/2006 | Deshpande | 370/412 |
| 2006/0153247 A1 | 7/2006 | Stumer | 370/517 |
| 2006/0161676 A1 | 7/2006 | Hong et al. | 709/231 |
| 2006/0165090 A1* | 7/2006 | Kalliola et al. | 370/395.21 |
| 2006/0168302 A1 | 7/2006 | Boskovic et al. | 709/231 |
| 2006/0187822 A1 | 8/2006 | Peleg | 370/229 |
| 2006/0187970 A1 | 8/2006 | Lee et al. | 370/516 |
| 2006/0190594 A1 | 8/2006 | Jorgenson et al. | 709/224 |
| 2006/0251093 A1* | 11/2006 | Curcio et al. | 370/412 |
| 2007/0047640 A1* | 3/2007 | Venna et al. | 375/240.01 |
| 2008/0043643 A1* | 2/2008 | Thielman et al. | 370/260 |

OTHER PUBLICATIONS

Extended European Search Report issued by the EPO for Application No. 07843799.3-2416 / 2062395: PCT/US2007080379; Reference: P32518EP-PCT.

* cited by examiner

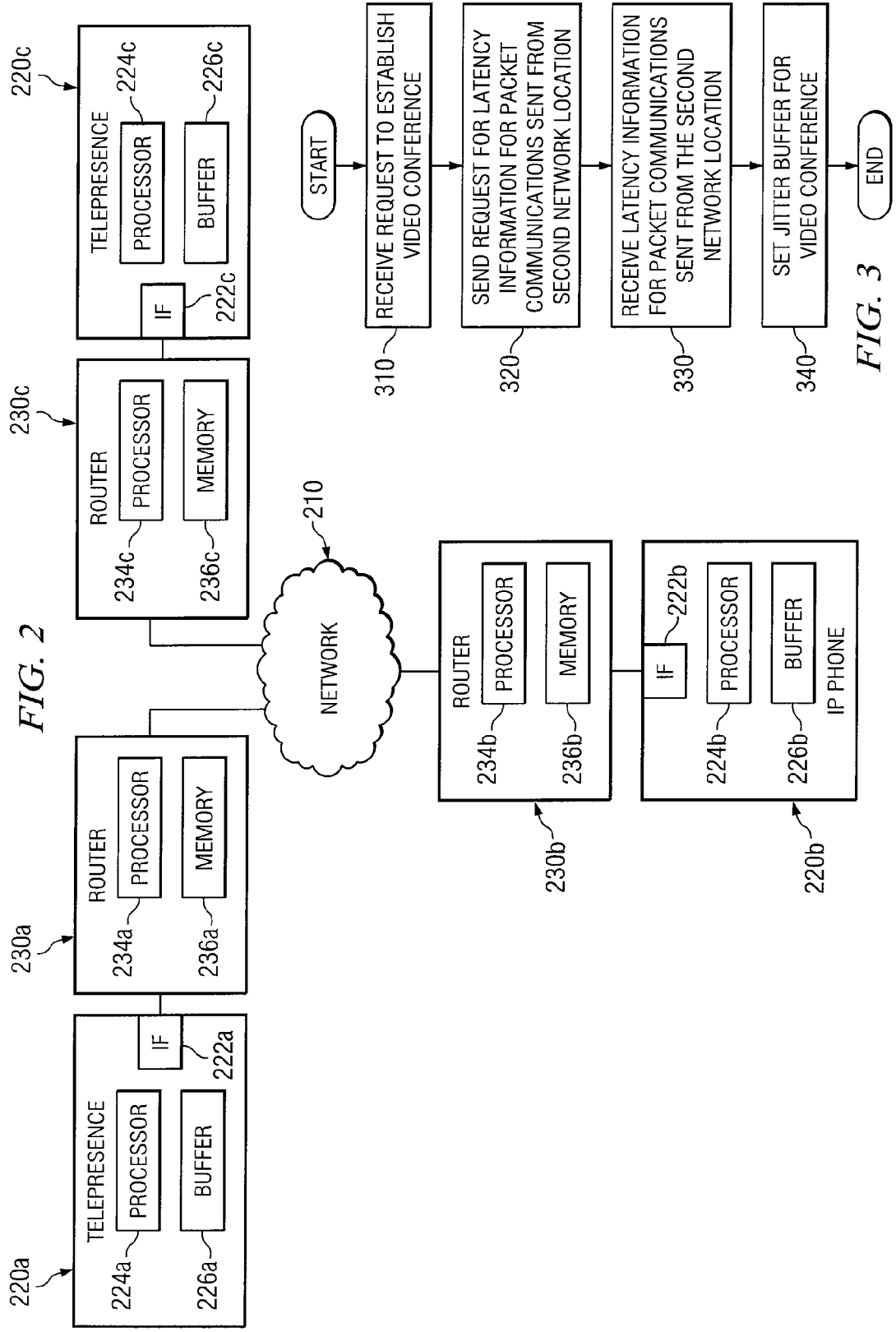

METHOD AND SYSTEM FOR OPTIMIZING A JITTER BUFFER

TECHNICAL FIELD OF THE INVENTION

This invention relates generally to communications systems and, more particularly, to a method and system for optimizing a jitter buffer.

BACKGROUND

As the "global economy" continues to expand, so does the need to be able to communicate over potentially long distances with other people. One area of communication that has seen steady growth and increased customer confidence is the use of the internet and other networking topographies. With the constant growth and development of networking capabilities has come the ability to implement more and better products and features. One area in particular that has seen growth and development in both quantity and quality is the area of internet enabled phone calls, using for example VoIP. By taking audio signals (the speaker's voice) and converting them into internet protocol (IP) packets, IP phones are able to send the audio signals over IP networks, such as the internet. Another technology enabled by the internet is video conferencing. Similar to internet enabled phone calls, internet enabled video conferencing is done by converting the audio and video data for the video conference into IP packets that are sent between the endpoints.

In order for video conferences or phone calls to be conducted over an IP network in real-time it is desirable to send/receive the packets in as little time as possible. Because packets may take different paths in an IP network the transit time of packets may vary and the packets may arrive in an order different than the order in which they were sent. A common device used to ensure that packets are presented smoothly despite being received at varying times and in an improper order is a jitter buffer. The jitter buffer temporarily stores the packets before they are presented to the user. Typical jitter buffers are set to hold the packets for a predetermined amount of time. The amount of time is usually based on assumptions, often worst case scenario type assumptions, as to the difference between the longest expected transit time and the shortest expected transit time. Some devices use jitter buffers that may increase the size of the jitter buffer if packets become lost because the jitter buffer is too small.

SUMMARY

In accordance with particular embodiments, a method and system for optimizing a jitter buffer is provided that substantially eliminates or reduces disadvantages and problems associated with previous systems and methods.

In accordance with a particular embodiment, a method for optimizing a jitter buffer includes receiving a first request to establish a video conference communication session with a remote endpoint. The method also includes sending a second request to a first network location for latency information for packet communications sent from a second network location. The method further includes receiving from the first network location the latency information for packet communications sent from the second network location. Additionally, the method includes setting a jitter buffer for the video conference communication session based on the latency information for packet communications sent from the second network location.

In some embodiments the second request for latency information for packet communications sent from a second network location may include information from the request to establish a communication session with the remote endpoint such as a telephone number, an area code, an extension number, a remote endpoint identification name, and/or a remote endpoint identification number.

In particular embodiments the latency information for packet communications sent from the second network location is based on test packet communications sent from the second network location to the first network location. In some embodiments the latency information may be based on packet communications sent from the second network location to the first network location during a previous video conference communication session.

In some embodiments the first request to establish a video conference communication session with a remote endpoint may be received from a first endpoint. Furthermore, the second network location may be along a path between the first endpoint and the remote endpoint. In addition the packet communications of the video conference communication session may be communicated through the path.

In accordance with another embodiment, a method for optimizing a jitter buffer includes determining latency information for packet communications sent from a network location. The method further includes receiving a request from an endpoint initiating a video conference communication session for latency information for packet communications sent from the network location. The method also includes transmitting the latency information for packet communications sent from the network location to the endpoint to set a jitter buffer of the endpoint for the video conference communication session.

In accordance with another embodiment a method for optimizing a jitter buffer includes determining latency information for packet communications sent from a network location. The method also includes receiving a request to establish a video conference communication session with a remote endpoint. The method additionally includes setting a jitter buffer based on the latency information for packet communications sent from the network location.

In accordance with another embodiment a system for optimizing a jitter buffer includes an interface operable to receive a first request to establish a video conference communication session with a remote endpoint. The interface is further operable to send a second request to a first network location for latency information for packet communications sent from a second network location. The interface is also operable to receive from the first network location the latency information for packet communications sent from the second network location. The system also includes a processor coupled to the interface. The processor is operable to set a jitter buffer for the video conference communication session based on the latency information for packet communications sent from the second network location.

Technical advantages of particular embodiments include a dynamic jitter buffer that accounts for actual observed latency as opposed to estimates intended to cover worst-case scenarios. Accordingly, the size of the jitter buffer may be reduced; this may reduce any delay associated with the size of the jitter buffer. Another technical advantage of particular embodiments includes taking into account different latencies for packets sent from different locations. Accordingly the jitter buffer is optimized for the location from which the packets are being received, thus allowing for a more efficient use of resources.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

To provide a more complete understanding of particular embodiments, and the features and advantages thereof, reference is made to the following description, taken in conjunction with the accompanying drawings, in which:

FIG. 2 illustrates a block diagram of three endpoints coupled to a network, in accordance with a particular embodiment; and FIG. 3 illustrates a method for optimizing a jitter buffer, in accordance with a particular embodiment.

DESCRIPTION OF EXAMPLE EMBODIMENTS

Figure 1:
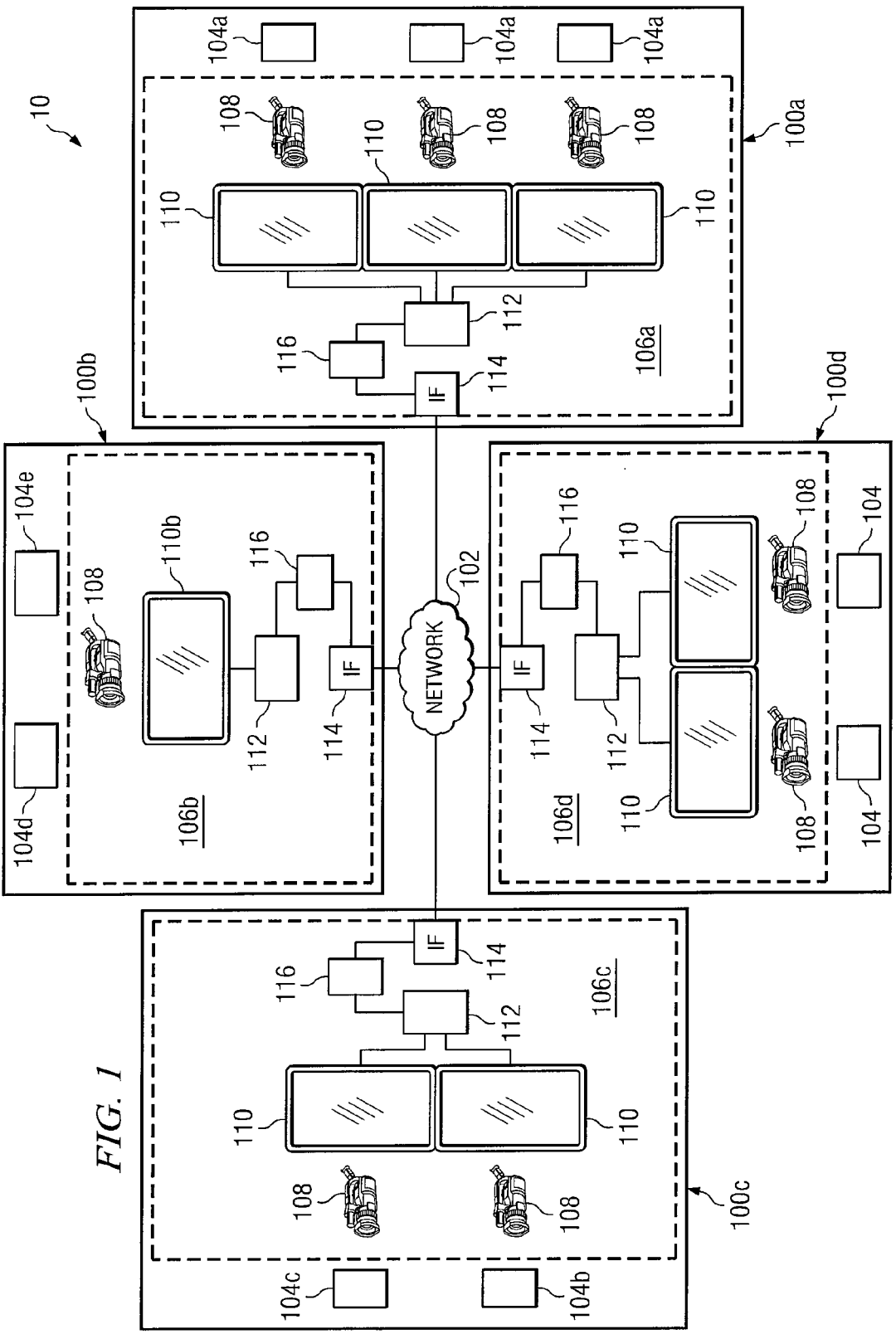
FIG. 1 illustrates a block diagram illustrating a system for conducting a video conference between locations using at least one telepresence system, in accordance with a particular embodiment.

FIG. 1 is a block diagram illustrating a system for conducting a video conference between locations using at least one telepresence system. The illustrated embodiment includes a network 102 that facilitates a video conference between remotely located sites 100 using endpoints 106. Any one of endpoints 106 may include a telepresence system. Sites 100 include any suitable number of users 104 that participate in the video conference. System 10 provides users 104 with a realistic videoconferencing experience even though a local site 100 may have less telepresence equipment than a remote site 100.

In facilitating a video conference endpoint 106 may use jitter buffer 116 to temporarily store packet communications that are received before presenting them to the user. This allows the packet communications to be presented with the appropriate timing, even if the timing of the arrival of the packet communications is incorrect because of variances in the transit times of the packet communications. By temporarily storing the packet communications endpoints 106 may then pull the packet communications from jitter buffer 116 at appropriate intervals and/or in the order they were sent (not necessarily at the intervals or in the order in which they were received). As may be apparent, the larger jitter buffer 116 is the longer packet communications may have to wait before being presented to the user. In real-time communications, such as video conferences, this can cause undesired delay between when a remote user speaks and when a local user actually hears the speech. Some embodiments reduce the initial size of jitter buffer 116 by taking into account the location of the remote endpoint. For example, by maintaining a record of the latencies for packets sent from particular locations, the jitter buffer may be set with an initial value that more closely approximates the actual latencies involved in a communication session with the particular remote endpoint as opposed to setting the jitter buffer based on a worst-case scenario. More specifically, the jitter buffer may be set based on the difference between the observed minimum and maximum latency values (e.g., the shortest and longest observed transit times) for packets sent from particular locations. The latency information may be collected and stored by any of a variety of network components coupled to network 102 including, for example, routers and/or endpoints.

User 104 represents one or more individuals or groups of individuals who are present for the video conference. Users 104 participate in the video conference using any suitable device and/or component, such as an Internet Protocol (IP) phones, video phone appliances, personal computer (PC) based video phones, and streaming clients. During the video conference, users 104 engage in the session as speakers or participate as non-speakers.

Endpoint 106 facilitates the videoconferencing among users 104. Endpoint 106 may include any suitable elements to establish and facilitate the video conference. For example, endpoint 106 may include speakers, microphones, or a speakerphone. In the illustrated embodiment, endpoint 106 includes cameras 108, monitors 110, processor 112, network interface 114, and jitter buffer 116. In particular embodiments, endpoint 106 may include telepresence equipment.

Cameras 108 include any suitable hardware and/or software to facilitate both capturing an image of user 104 and her surrounding area as well as providing the image to other users 104. Cameras 108 capture and transmit the image of user 104 as a video signal (e.g., a high definition video signal). Monitors 110 include any suitable hardware and/or software to facilitate receiving the video signal and displaying the image of user 104 to other users 104. For example, monitors 110 may include a notebook PC or a wall mounted display. Monitors 110 display the image of user 104 using any suitable technology that provides a realistic image, such as high definition, high-power compression hardware, and efficient encoding/decoding standards. Endpoint 106 establishes the video conference session using any suitable technology and/or protocol, such as Session Initiation Protocol (SIP) or H.323. Additionally, endpoint 106 may support and be interoperable with other video systems supporting other standards, such as H.261, H.263, and/or H.264.

Processor 112 controls the operation and administration of endpoint 106 by processing information and signals received from cameras 108 and interfaces 114. Processor 112 includes any suitable hardware, software, or both that operate to control and process signals. For example, processor 112 may be a programmable logic device, a microcontroller, a microprocessor, any suitable processing device, or any combination of the preceding. Interface 114 communicates information and signals to and receives information and signals from network 102. Interface 114 represents any port or connection, real or virtual, including any suitable hardware and/or software that may allow endpoint 106 to exchange information and signals with network 102, other endpoints 106, and/or other elements of system 10.

Jitter buffer 116 may temporarily store information received via interface 114. In particular embodiments, processor 112 may set the size of jitter buffer 116 based on latency information for similar video conferences. This may allow for the setting of an initially smaller jitter buffer which may decrease the amount of memory used and the delay between when user 104 speaks and when telepresence equipment 106 reproduces the speech.

In the illustrated embodiment, network 102 may facilitate one or more different types of calls. For example, network 102 may facilitate a voice over internet protocol (VoIP) call between endpoints 100a and 100c, a video over IP video conference between endpoints 100b and 100d, an on-line gaming service, or any other functionality provided via a network.

Network 102 represents communication equipment, including hardware and any appropriate controlling logic, for interconnecting elements coupled to network 102 and facilitating communication between sites 100. Network 102 may include a plurality of segments and nodes that facilitate in coupling endpoints 106 with one another. Therefore, user 104d of site 100b may be provided with access to endpoints 106a, 106c and 106d. Furthermore, endpoints 106, may communicate control and data signals among each other. Nodes may include any combination of network components, session border controllers, gatekeepers, call managers, conference bridges, routers, hubs, switches, gateways, endpoints, edgepoints, or any other hardware, software, or embedded logic implementing any number of communication protocols that allow for the exchange of packets through network 102.

Network 102 may include one or more local area networks (LANs), metropolitan area networks (MANs), wide area networks (WANs), any other public or private networks, local, regional, or global communication networks, enterprise intranets, other suitable wireline or wireless communication links, or any combination of the preceding. Generally, network 102 provides for the communication of packets, cells, frames, or other portions of information (generally referred to as packets herein) between endpoints 106. While only four endpoints 106 are depicted herein, network 102 may support any number of endpoints, segments and nodes.

In particular embodiments, network 102 may employ voice communication protocols that allow for the addressing or identification of endpoints and/or nodes coupled to network 102. For example, using Internet protocol (IP), each of the components coupled together by network 102 may be identified in information directed using IP addresses. In this manner, network 102 may support any form and/or combination of point-to-point, multicast, unicast, or other techniques for exchanging packet communications among components coupled thereto. Any network components capable of exchanging audio, video, or other data using frames or packets are included within the scope of the present invention.

Network 102 may be directly coupled to other IP networks including, but not limited to, another LAN or WAN, or the Internet. Since IP networks share a common method of transmitting data, packet communications may be transmitted between devices located on different, but interconnected, IP networks. In addition to being coupled to other IP networks, network 102 may also be coupled to non-IP telecommunication networks through the use of interfaces or components, such as gateways. One such non-IP telecommunication network may be a public switched telephone network (PSTN). A PSTN may include switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like a PSTN), a dedicated circuit is not required for the duration of a video conference, call, or fax transmission over IP networks. Furthermore, it may be that the endpoints do not propagate messages or communications along the same path as each other.

Technology that allows packet communications to be transmitted over an IP network may comprise Voice over IP (VoIP), or simply Voice over Packet (VoP). In the illustrated embodiment, endpoints 106 may include IP telephony capabilities allowing them to participate in and/or monitor audio, video, and other multimedia communication sessions. IP telephony devices have the ability to encapsulate a user's voice (or other input) into IP packets so that the voice can be transmitted over network 102. IP telephony devices may include telephones, fax machines, computers running telephony software, nodes, gateways, wired or wireless devices, hand held PDAs, or any other device capable of performing telephony functions over an IP network. Similarly, endpoints 106 may be able to conduct video conferences in which not only is the user's voice encapsulated into IP packets but a video image of the user may also be encapsulated in IP packets.

In particular embodiments, network 102 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

In an example embodiment of operation, users 104d and 104e may desire to use endpoint 106b to engage in a video conference with users 104b and 104c at site 100c. In doing so they may, for example, provide endpoint 106b with a phone number associated with endpoint 106c. Upon receiving the request for a video conference with endpoint 106c, interface 114 may send a request for latency information, for video conference packet communications sent from endpoint 106c, to a network component, such as a router, that has the latency information stored therein. Upon receiving the requested latency information through interface 114, via the network component, processor 112 may use the latency information to set the size of jitter buffer 116. This may allow for the jitter buffer to be sized based on the requested video conference, rather than based on a worst-case scenario.

Modifications, additions, or omissions may be made to system 10. For example, system 10 may include any suitable number of sites 100 or endpoints 106 and may facilitate a video conference between any suitable number of sites 100 or endpoints 106. As another example, endpoints 106 may include any suitable number of cameras 108 and monitors 110 to facilitate a video conference. As yet another example, the video conference between endpoints 106 may be point-to-point conferences or multipoint conferences. Moreover, the operations of system 10 may be performed by more, fewer, or other components. Additionally, operations of system 10 may be performed using any suitable logic.

FIG. 2 illustrates a block diagram of three endpoints coupled to a network. The depicted embodiment includes endpoints 220a, 220b and 220c. Endpoints 220 may be endpoints that support IP telephony, or video conferencing over IP networks, such as IP phones, telepresence systems, video conference systems, video conferencing equipment or computers running telephony or video conferencing software enabling them to communicate using, for example, VoIP technology. Endpoints 220 may include interfaces 222, processors 224, and buffers 226. Located functionally between network 210 and endpoints 220 may be routers 230. Routers 230 may provide any number of endpoints with a connection to communication network 210.

Communication network 210 may be similar to network 102 from FIG. 1. Communication network 210 couples endpoints 220 with one another, as well as any other endpoints or components that may be coupled to communication network 210. This allows any of the components coupled to communication network 210 to communicate either data or control signals with one another. Communication network 210 may comprise more than one network. Furthermore, communication network 210 may comprise several different components including, but not limited to, routers, hubs, switches, edgepoints, media gateways, media servers, and other communication components. The media gateways may couple different types of networks so that data may be transferred between networks using different protocols. For example, a gateway may couple a PSTN network to an IP network.

Endpoints 220 may be similar to one or more of endpoints 100 described above with respect to FIG. 1. In some embodiments, one or more of endpoints 220 may be a non-IP endpoint, such as a PSTN phone. In such a case there may, in addition to router 230, be an intermediary component, such as a gateway, which may translate between the PSTN and the IP network and may comprise features and functions similar to the features and functions of an IP endpoint.

Interfaces 222 may couple endpoints 220 with communication network 210 via routers 230. Interfaces 222 may be operable to transmit and receive communications, such as packet communications containing the encapsulated voice or video, control signaling being sent to/from routers 230 or other components of network 210, or any other communications that may be transmitted or received by endpoint 220 to or from any other components coupled to network 210.

Processors 224 may be microprocessors, controllers, or any other suitable computing devices, resources, or combination of hardware, software and/or encoded logic. Processors 224 do not need to be the same type of device, for example, processor 224a may be a microprocessor and processor 224b may be a microcontroller. Processors 224 may be used to calculate and set the size of jitter buffer 226 based on latency information corresponding to the location of a remote endpoint (e.g., the endpoint dialed by a local user). In particular embodiments processor 224 may be used in combination with a memory unit to determine and store latency information of packet communications from other network locations.

Routers 230 may provide multiple endpoints with access to network 210. Routers 230 may include router processors 234 and memory 236. In some embodiments routers 230 may periodically send test packets to each other and/or to other network components of network 210 to test the latency. These latency tests may be used as a way to gather latency information. For example, router 230a may send a packet to routers 230b and 230c. Processors 234b and 234c of Routers 230b and 230c, respectively, may then be able to determine the latency of the packet. This information may be added to a database stored in memory 236b and 236c of routers 230b and 230c, respectively. In particular embodiments, routers 230 may periodically record the latency of packets sent during a communication session as a way to gather latency information. For example, during a communication session between endpoints 220b and 220c, processors 234b and 234c of routers 230b and 230c, respectively, may periodically determine the latency of a packet sent between each other as part of the communication session. The determined latency may then be stored in the database maintained within memory 236b and 236c, respectively.

Depending on the embodiment, the latency information may be stored or sorted by various different factors such as the location of the source (e.g., a database in router 230a may maintain the latency information for packets from router 230b separately from the latency information for packets sent from router 230c), the time of day the packets are sent, the day of the week the packets are sent, the quality of service (QoS) markings of the packets that are sent, the type of packets that are sent (e.g., a packet containing audio or a packet containing video), and/or any other factor that may allow for a more accurate approximation of the latency. As alluded to above, the gathering, sorting and storing of latency information may be done by any network component coupled to network 210. For example, in particular embodiments, endpoints 220 may maintain the latency information.

When, for example, endpoint 220a wants to establish a communication session with endpoint 220b, endpoint 220a may, via interface 222a, send a request to router 230 for the latency information. Depending on the embodiment, the particular latency information sent to the endpoint may depend on one or more pieces of information derived by the endpoint or the router. For example, a user may select endpoint 220b from a quick-name list, and the selected quick-name may then need to be translated into a phone number. Once the phone number is determined, the location of endpoint 220b may be determined along with the path from endpoint 220a to 220b and/or the identity of a particular router along the path (e.g., router 230b). Along with the location of router 220b, information such as the time of day, day of the week, the desired type of communication session, and/or the QoS of the communication may be gathered. Some or all of this information may be determined via processor 224a and included in a request sent to router 230a. Router 230a may receive the request and, using one or more of the pieces of information from above, may use processor 234a to determine what latency information has been requested. Then router 230a may load the appropriate latency information from memory 236a and send it to endpoint 220a.

The latency information may be received from router 230a via interface 222a. Once received, processor 224a may use the latency information to determine the size of the jitter buffer. The size of the jitter buffer may vary for each call depending on who is being called, what time it is, what type of call is being placed, the QoS requirement of the call and/or current traffic congestion of the network. In some embodiments router 230 may provide the maximum and minimum latency values. In particular embodiments router 230 may supply the requested latency information and endpoint 220, via for example processor 224, may determine the maximum and minimum latency values. Either way, this provides an efficient way to set the size of the jitter buffer for each communication session as opposed to simply making a worst-case scenario type guess that is used for all communication sessions.

In order to see how the latency information may decrease the size of the jitter buffer, assume that endpoints 220a and 220b are on opposite sides of the same city and that endpoint 220c is on the opposite side of the country. Further assume that the busiest time of the day is between 8:00 am and 4:00 pm, Monday through Friday, with Monday being the busiest day and Friday being the slowest day. In this scenario, a typical endpoint may have the jitter buffer set to account for the latency in the worst-case scenario; the jitter buffer may be set based on the latency of packets sent across the country, from 220a to 220c, on Monday between 8:00 am and 4:00 pm. As should be apparent, not all communication sessions are going to be initiated at the busiest time between endpoints on opposite sides of the country. More specifically, calls on Saturday after 4:00 pm between endpoints 220a and 220b likely would not need a jitter buffer large enough to account for the worst-case scenario. By utilizing current latency information that may be specific to a particular location endpoints 220 may be able to decrease the initial size of the jitter buffer. For each communication session, endpoint 220 may request the latency information before the communication session is established (e.g., regardless of whether the endpoint is the caller or the callee). Then, based on the difference between the maximum and minimum latency values, processor 224 of endpoint 220 may set the initial size of jitter buffer 226 for the upcoming communication session. Thus, the jitter buffer may be dynamically set for each communication session based on when and where the communication session is being conducted and the network traffic during that time. This may allow for a much smaller jitter buffer to be used in those communications in which the latency information indicates that the difference between the maximum and minimum latency values for similar communication sessions was smaller than the worst-case scenario. In particular embodiments, in communication sessions in which the latency for packets sent from a remote location is not known, a default latency may be used based on the above described worst-case scenario. Furthermore, it should be noted that initially setting the jitter buffer to a smaller size based on prior recorded latency information does not preclude increasing the size of the jitter buffer during a communication session to adapt to actual latencies.

It will be recognized by those of ordinary skill in the art that endpoints 220 are merely example configurations of an endpoint for optimizing the jitter buffer, in accordance with particular embodiments. Other endpoints may include any number of interfaces, processors, buffers, and/or other components to accomplish the functionality and features described herein. For example, although endpoint 220a is illustrated and described as including interface 222a, processor 224a, and buffer 226a these components and other desired components for performing the above described functionality may be centrally located (local) with respect to one another, or distributed throughout communication network 210.

FIG. 3 is a flowchart illustrating a method of optimizing a jitter buffer. The method begins at step 310 where a request to establish a video conference is received. The request may come, for example, from a local user who wants to initiate a video conference with a remote user and has entered in the appropriate phone number, or it may come from a user of a remote endpoint who wants to partake in a video conference with a local user who is using the endpoint that received the request for a video conference. For purposes of this flowchart it will be assumed that the request for a video conference was received at a local endpoint from a local user.

Depending on how the endpoint is configured, the request from the user may include a telephone number, an area code, an extension number, a remote endpoint identification name, a remote endpoint identification number, or any other piece of information that may be useful in identifying a particular remote endpoint.

Regardless of where the request originates, once the request has been received it may be possible to determine the location of the remote endpoint. At step 320 a request is sent to a first network location for latency information for packets sent from a second network location. The second network location may be along the path between the local endpoint and the remote endpoint. The second network location may be the last network component along the path before the remote endpoint. Each network location may be a router, an endpoint, an edgepoint, a gateway, or any other network component operable to receive and/or transmit IP packets. For example, in particular embodiments the latency information may be gathered and stored within the local endpoint. For simplicity and not to limit in any way the above list of possible types of network locations, the first network location will hereinafter be referred to as the local router and the second network location will hereinafter be referred to as the remote router. Depending on the embodiment, the requested latency information may range from being relatively specific to relatively general. For example, the requested latency information may be as general as the average latency over a particular time period for packets from the remote location. A more detailed example might include the average latency for packets containing the same type of data, sent from the same remote router, on the same day of the week, and at the same time of day. This information may be supplied entirely within the request for the latency information, or a portion of it may be ascertained by the local router from a simpler request. For example, the request may ask for latency information for video conference packets sent from router 'X' on a Thursday between 1 and 2 o'clock. As another example, the request may simply ask for latency information for packets from the remote endpoint, and the local router may determine the location and/or identity of the remote router, the time of the day and the day of the week.

The local router may determine latency information through a variety of methods that may be used alone or in combination. One such method for determining the latency information is by collecting latency data. This may involve periodically sending and receiving test packets between network locations. The test packets may be sent out at different times during the day. Each time the local router receives a test packet it may record the latency associated with the packet (e.g., by comparing the start of the transmission of the packet by the remote network location with the start of the receipt of the packet by the local network location), the source of the packet and any other information (e.g., time of the day, day of the week, QoS marking) that may be useful in classifying or sorting the latency data. Another possible way the local router may collect latency data is by periodically recording the latency of packets sent during video conferences. Regardless of how the latency data was collected, once the local router has the data it may store the data in a database where it may later be sorted and/or compiled so as to provide the local endpoint with the requested latency information.

Once the latency information has been determined and sent off, at step 330 the latency information is received by the local endpoint. The local endpoint may then process, analyze or manipulate the latency information so that, at step 340, it may set the jitter buffer accordingly. This may involve determining the difference between the minimum and maximum latency values. For example, if the longest relevant latency value is 55 milliseconds, and the shortest relevant latency value is 45 milliseconds, then the jitter buffer may be set at 10 milliseconds, the difference between the longest and shortest latency times. Thus, the jitter buffer may be specifically set for that particular call, as opposed to being generally set for every call based on the worst-case scenario. The local endpoint may, for example, set the jitter buffer based on latency information for packets sent from the remote router. By setting the jitter buffer based on the latency information provided by the local router, the local endpoint's jitter buffer is likely to be smaller than an endpoint that sets its jitter buffer based on a worst-case scenario. The smaller jitter buffer may reduce the delay between when a remote user speaks and when a local user hears the speech. The smaller jitter buffer may also help to conserve resources.

Some of the steps illustrated in FIG. 3 may be combined, modified or deleted where appropriate, and additional steps may also be added to the flowchart. Additionally, steps may be performed in any suitable order without departing from the scope of the invention. For example, in some embodiments the local endpoint may maintain its own latency information; in which case it may not send a request for latency information to the local router but would rather query its own database.

Although particular embodiments have been described in detail, it should be understood that various other changes, substitutions, and alterations may be made hereto without departing from the spirit and scope of the present invention. For example, although particular embodiments have been described with reference to a number of elements included within communication system 30 and endpoints 220, any of these elements may be combined, removed, altered, rearranged or positioned in order to accommodate particular routing architectures or needs. In addition, any of these elements may be provided as separate external components to communication system 30, endpoints 220, or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method, comprising:
   periodically receiving latency test packets, each test packet originating from one of a plurality of network locations;
   storing timing, location, and observed latency values associated with the latency test packets received from the plurality of network locations;
   receiving a request to establish a video conference communication session with a remote endpoint;
   determining a path to the remote endpoint;
   identifying a first network location along the path to the remote endpoint;
   determining latency information for packet communications sent from the first network location, the latency information specific to the requested video conference communication session based on a timing of the request, and the timing, location and observed latency values associated with the first network location; and
   transmitting the latency information for packet communications sent from the first network location to a local endpoint to set a jitter buffer for the video conference communication session based on an observed minimum latency value and an observed maximum latency value associated with the latency information for packet communications sent from the first network location.

* * * * *